May 27, 1930. L. JANISCH ET AL 1,760,556
ELECTRIC BRAKING
Filed Sept. 26, 1927
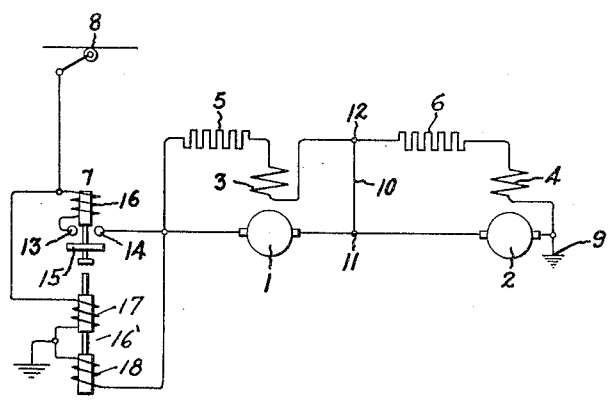
Inventors:
Leopold Janisch
Wilhelm Welsch
by Alexander S. Lunn
Their Attorney Patented May 27, 1930

1,760,556

UNITED STATES PATENT OFFICE

LEOPOLD JANISCH, OF BERLIN, AND WILHELM WELSCH, OF BERLIN-NIEDERSCHON-HAUSEN, GERMANY, ASSIGNORS TO GENERAL ELECTRIC COMPANY, A CORPORATION OF NEW YORK

ELECTRIC BRAKING

Application filed September 26, 1927, Serial No. 221,881, and in Germany December 24, 1926.

Our invention relates to electric braking particularly where a plurality of electric motors are employed and has for its principal object an improved arrangement of the braking connections that automatically provides a continued braking action even though a portion of the braking machines should become disabled.

In the operation of trains on electric railways, the ordinary forms of series driving motors are often used for braking purposes. When so used, they generate electrical energy which may either be returned to the supply net or dissipated in the form of heat by suitable braking resistors. In the past, both kinds of braking have been employed on the same vehicle, and in such manner that if the electromotive force generated by the series motors was of sufficiently high value a regenerative braking would take place, whereas if the generated electromotive force was not of a sufficiently high value a dynamic braking would occur. The switching from one kind of braking to the other has been accomplished automatically by means of suitable switching mechanisms well known in the art.

Briefly, with our present invention embodied in a braking system of the above character, electrical braking operation of a portion of the motors is insured, even though either the regenerative braking circuit or the dynamic braking circuit for all of the motors should be broken, as for example when an interruption occurs in either the field circuit or armature circuit of one of the motors. In accordance with the preferred form of our invention, the several motor armatures, or groups of armatures are connected up in series relationship with each other and the corresponding field windings are connected in series relationship with each other in a separate circuit which is connected in parallel around the series of armatures. Points in the armature circuit between the armatures are connected with corresponding points in the field circuit between the field windings by means of suitable conductors. Under normal operation these points are at equal potential and no current of appreciable value will flow in these conductors. However, should a defect develop in the regenerative braking circuit by reason of an interruption in the circuit or otherwise, of one of the motors, such as to render this motor incapable of further braking action, the regenerative braking circuit will be automatically interrupted and a dynamic braking circuit will automatically and immediately be formed by means of these conductors for the remainder of the motors.

This is due to the provision of dynamic braking resistors in the field circuit of each motor. These resistors are so chosen that when connected in series automatically with the corresponding motor armature and field to form a local dynamic braking circuit, the braking circuit will have the requisite ohmic value.

Our invention will best be understood by reference to the following description taken in connection with the accompanying drawing, the single figure of which is a diagrammatic representation of one form of our novel braking arrangement. For the sake of simplicity we have illustrated our invention in connection with but two motors, but it is of course to be understood that a greater number of motors may be employed.

Referring now to the drawing, the armatures 1 and 2 of two direct current electric motors are shown connected in series relationship with each other. The corresponding field windings 3 and 4 are connected in a separate circuit in parallel with the armatures 1 and 2. Resistors 5 and 6 of suitable ohmic value are connected in series in this circuit, and as is evident from the drawing, they are connected alternately between the field windings so as to form a unit composed of a field winding and resistor for each motor. An automatic switch 7 is connected in circuit between the motor armatures 1 and 2 and a source of supply herein shown as a point 8 on the supply net. The return path to the source of supply is represented in the drawing by the earth connection 9. Conductor 10 serves as a connection from a point 11 between the motor armatures 1 and 2 to a corresponding point 12 in the field circuit between the field winding 3 and the resistor 6. When the motors are acting as generators and generate an electromotive force which exceeds that of the source of supply by a predetermined amount, the automatic switch 7 is operated to closed position by relay 16' having the supply voltage responsive winding 17 and the regenerative voltage responsive winding 18 and the contacts 13 and 14 are bridged by the bridging member 15. The two armatures 1 and 2 are thereby connected with the point 8 on the supply net, and energy is returned to the supply source.

The operation of our invention is as follows: Should either the field circuit or the armature circuit of either motor be interrupted from any cause whatsoever, during the regenerative braking operation, the energization of the operating coil 16 of the automatic switch 7 will be reduced and the bridging member 15 caused to return to open position, thereby permanently interrupting the regenerative braking circuit. The undamaged motor will no longer return energy to the net, but instead will deliver energy through the conductor 10 to the dynamic braking unit consisting of the field winding and corresponding resistor, where the energy will be dissipated in the form of heat. This dynamic braking circuit for one of the motors is armature 1, resistor 5, field winding 3, conductor 10, and for the other motor, armature 2, conductor 10, resistor 6 and field winding 4. If neither of the motors are damaged, but the generated electromotive force is less than that existing at the net the motors will be dynamically braked and the circuit will be armature 2, armature 1, resistor 5, field winding 3, resistor 6, field winding 4.

Obviously, our invention is not limited to connecting individual motors in series with each other, but instead we may connect individual motors in parallel to form groups of motors, and connect the groups in series with each other.

What we claim as new and desire to secure by Letters Patent of the United States is:

1. In an electric braking system, the combination of a plurality of electric motors having their armatures connected in series and their field windings connected in a parallel excitation circuit with the armatures for regenerative braking operation with a source of electric power, a plurality of resistors included in said excitation circuit for controlling the regenerative braking excitation current and providing for dynamic braking operation of the motors independently of the power source, means for disconnecting the armature circuit and excitation circuit from the power source, and connections between the excitation circuit and the armature circuit of the motors permitting separate dynamic braking operation of different portions of the motors.

2. In an electric braking system, the combination of a plurality of electric motors having their armatures and field windings connected in series circuits with the field circuit connected in parallel with the armature circuit for regenerative braking operation of the motors with a source of electric power, a plurality of resistors connected in the field circuit alternately with the field windings of the motors for controlling the regenerative braking operation of the motors and providing for dynamic braking of the motors independently of the power source, means for disconnecting the motor armature and field circuits from the power source, and connections between the motor armature and field circuits providing a local dynamic braking circuit for each motor independently of the other motors.

3. In a system of control for electric motors having their armatures connected in series with each other and supplied from a source of electric power, a circuit connected in parallel relationship with said motors comprising a plurality of units connected in series with each other, each of said units comprising a field winding and a resistor for dynamic braking operation of the motors, means for disconnecting the motor armatures and field windings from the power source and means for connecting a point in circuit between said units with a point in circuit between said armatures to permit separate dynamic braking of the motors.

4. In a system of motor control, a source of electric power, a plurality of direct current electric motors having their armatures connected in series relationship with each other and normally arranged to return regenerative braking current to said source when the generated voltage of said motors exceeds that of said source, a circuit connected in parallel with said motors comprising a plurality of units, connected in series with each other, each of said units comprising a field winding and a resistor, automatic means responsive to failure of the regenerative braking current for disconnecting the motor armature and field circuits from the source of electric power, and means for causing the remainder of said motors to be braked dynamically by their corresponding braking units when one of said motors becomes defective.

5. In a system of motor control, a source of electric power, a plurality of direct current electric motors having their armatures connected in a series circuit and normally arranged to return regenerative braking current to said source when the generated voltage of said motors exceeds that of said source, a unit comprising a field winding and a resistor for each of said motors, said units being connected together to form a dynamic braking circuit in parallel with said armatures, an automatic switch having an operating winding connected in the regenerative braking circuit of said motors to be responsive to failure of the regenerative braking current therein for interrupting the regenerative braking circuit, and connections between intermediate points in circuit with said armatures and corresponding points in circuit with said dynamic braking units, whereby the remainder of the motors are dynamically braked by said dynamic braking units when one of said motors becomes defective.

In witness whereof, we have hereunto set our hands this 7th day of September, 1927.

LEOPOLD JANISCH.
WILHELM WELSCH.